(12) United States Patent
Casey et al.

(10) Patent No.: US 7,186,347 B2
(45) Date of Patent: Mar. 6, 2007

(54) VIBRATORY APPARATUS FOR SEPARATING LIQUID FROM LIQUID LADEN SOLID MATERIAL

(75) Inventors: Dwight Paul Casey, Lindenhurst, IL (US); Tobin Lane Imes, Crystal Lake, IL (US); Oscar Lee Mathis, Jr., Cary, IL (US)

(73) Assignee: General Kinematics Corporation, Crystal Lake, IL (US)

( * ) Notice: Subject to any disclaimer, the term of this patent is extended or adjusted under 35 U.S.C. 154(b) by 141 days.

(21) Appl. No.: 10/121,097

(22) Filed: Apr. 11, 2002

(65) Prior Publication Data

US 2003/0192819 A1   Oct. 16, 2003

(51) Int. Cl.
*B01D 39/10* (2006.01)
*B01D 33/03* (2006.01)
*B01D 35/20* (2006.01)
*B01D 33/54* (2006.01)
*B07B 1/12* (2006.01)

(52) U.S. Cl. .................. 210/797; 210/780; 210/388; 210/389; 210/498; 210/499; 209/393; 209/395; 209/396

(58) Field of Classification Search ............ 198/369.1, 198/542, 560, 561, 565, 567, 609, 690.2, 198/771; 210/767, 780, 388, 389, 498, 499; 209/393, 395, 396
See application file for complete search history.

(56) References Cited

U.S. PATENT DOCUMENTS

| | | | |
|---|---|---|---|
| 728,390 A | 5/1903 | Graham | |
| 1,942,948 A | 1/1934 | Booth | |
| 2,014,431 A * | 9/1935 | Foster | 210/150 |
| 2,084,433 A | 6/1937 | Levi | |
| 2,089,548 A | 8/1937 | Frantz et al. | |
| 2,142,600 A | 1/1939 | Bixby | |
| 2,183,896 A * | 12/1939 | Rupp et al. | 210/785 |
| 2,208,448 A | 7/1940 | Bixby | |
| 2,457,018 A | 12/1948 | Wantling | |
| 2,503,875 A * | 4/1950 | Kern | 210/384 |
| 2,585,719 A | 2/1952 | Alvord | |
| 2,588,088 A | 3/1952 | Cover | |
| 2,648,441 A | 8/1953 | Soldan | |
| 2,677,463 A * | 5/1954 | Von Bolhar et al. | 209/455 |

(Continued)

FOREIGN PATENT DOCUMENTS

DE         2260170         6/1974

(Continued)

*Primary Examiner*—Minh-Chau T. Pham
(74) *Attorney, Agent, or Firm*—Marshall, Gerstein & Borun LLP

(57) ABSTRACT

A vibratory apparatus for separating a liquid from a liquid-laden solid material. The apparatus includes an inclined trough having a base with a first end and a second elevated with respect to the first end. A deck is attached to the trough base, the deck defining support points positioned above the base spaced from one another by a distance sufficient to support the solid material above the deck, and passages located between the support points to allow liquid to flow to the deck. A vibratory drive is attached to the trough and oriented impart a conveying motion toward the trough second end. Solid material deposited onto the deck is advanced toward the second end by the conveying motion while the liquid flows along the trough base toward the first end under gravity.

17 Claims, 7 Drawing Sheets

U.S. PATENT DOCUMENTS

| | | | |
|---|---|---|---|
| 2,799,398 A | 7/1957 | Heymann | |
| 2,899,061 A | 8/1959 | Schroth | |
| 3,116,819 A * | 1/1964 | Katz | 198/383 |
| 3,134,733 A | 5/1964 | Rose | |
| 3,255,885 A | 6/1966 | Burls | |
| 3,257,309 A | 6/1966 | Fauchier et al. | |
| 3,365,281 A | 1/1968 | Musschoot et al. | |
| 3,411,171 A | 11/1968 | Musschoot et al. | |
| 3,787,318 A | 1/1974 | Coleman, Jr. | |
| 3,805,955 A | 4/1974 | Bixby et al. | |
| 3,859,713 A | 1/1975 | Fiedler | |
| 3,970,549 A | 7/1976 | Ennis et al. | |
| RE29,512 E | 1/1978 | Musschoot | |
| 4,146,483 A * | 3/1979 | Lee | 210/384 |
| 4,171,948 A | 10/1979 | Kraus et al. | |
| 4,258,779 A | 3/1981 | Musschoot | |
| 4,357,760 A | 11/1982 | Musschoot | |
| 4,459,207 A * | 7/1984 | Young | 209/269 |
| 4,482,046 A | 11/1984 | Kraus | |
| 4,526,121 A | 7/1985 | Shudo et al. | |
| 4,611,709 A | 9/1986 | Kraus et al. | |
| 4,624,370 A | 11/1986 | Danner et al. | |
| 4,715,950 A | 12/1987 | Danner et al. | |
| 4,844,235 A | 7/1989 | Sherman | |
| 4,844,236 A | 7/1989 | Kraus | |
| 4,856,640 A * | 8/1989 | Beswick et al. | 198/311 |
| 5,076,921 A | 12/1991 | Bailey et al. | |
| 5,094,342 A | 3/1992 | Kraus et al. | |
| 5,098,586 A | 3/1992 | Rudolph | |
| 5,190,161 A | 3/1993 | Arai | |
| 5,614,094 A | 3/1997 | Deister et al. | |
| 5,690,826 A * | 11/1997 | Cravello | 210/384 |
| 5,720,881 A | 2/1998 | Derrick et al. | |
| 6,702,102 B2 * | 3/2004 | Kraus et al. | 198/758 |
| 2003/0192819 A1 * | 10/2003 | Casey et al. | 210/255 |
| 2003/0201237 A1 * | 10/2003 | Grichar et al. | 210/785 |
| 2003/0217960 A1 * | 11/2003 | Casey et al. | 210/255 |
| 2004/0200786 A1 * | 10/2004 | Irvine | 210/797 |

FOREIGN PATENT DOCUMENTS

| | | |
|---|---|---|
| EP | 100132 | 2/1984 |
| WO | WO 01/45867 A1 | 6/2001 |

* cited by examiner

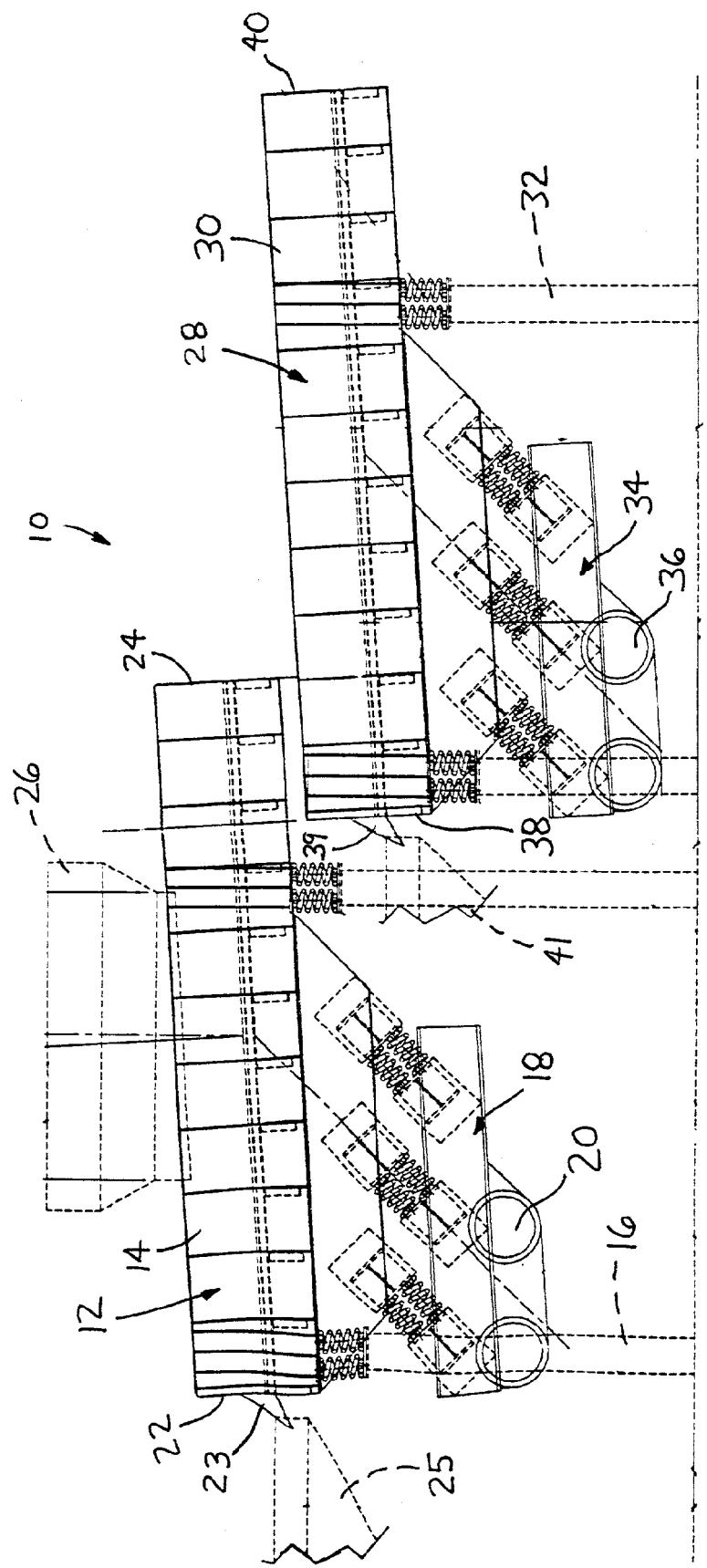

VIBRATORY APPARATUS FOR SEPARATING LIQUID FROM LIQUID LADEN SOLID MATERIAL

FIELD OF THE INVENTION

The present invention generally relates to vibratory apparatus, and more particularly to vibratory apparatus for separating liquid from a liquid-laden solid material.

BACKGROUND OF THE INVENTION

The need for separating liquid from a liquid-laden solid material may arise in a variety of applications. As crude oil is refined, for example, a residual material known as petroleum coke may be generated. Petroleum coke is a granular solid that is highly combustible. It is typically created in a coking drum having removable end caps, wherein a single piece of petroleum coke remains lodged inside the drum. To remove the petroleum coke from the drum, the end caps are removed and a hydraulic drill is inserted through a center of the piece of petroleum coke. The hydraulic drill first passes axially through the drum to create a two to three foot bore through the center of the petroleum coke. The drill is then pivoted so that its head is aligned radially with respect to the drum axis, and the drill is rotated to cut through and dislodge the petroleum coke material located nearer the drum. During the drilling and cutting processes, water is typically used to assist removal of the coke from the drum. Eventually, all of the petroleum coke and water will drop out of the bottom of the drum.

Further processing of the petroleum coke and water has typically included passing the material through a screen into a pit. The water and the petroleum coke is then pulled out of the pit and discharged into an evaporation field. Once the water content is sufficiently reduced, the petroleum coke is then loaded into rail cars which ultimately discharge the coke onto a conveyor. Consequently, the petroleum coke must be handled at separate transfer points, such as from the pit to the evaporation field and from the evaporation field to the conveyor. Furthermore, such handling often requires the use of rail cars which are overly expensive and time consuming to use.

BRIEF DESCRIPTION OF THE DRAWINGS

FIG. 1 is a side elevation view of vibratory separating apparatus in accordance with the teachings of the present invention.

DETAILED DESCRIPTION

Figure 3:
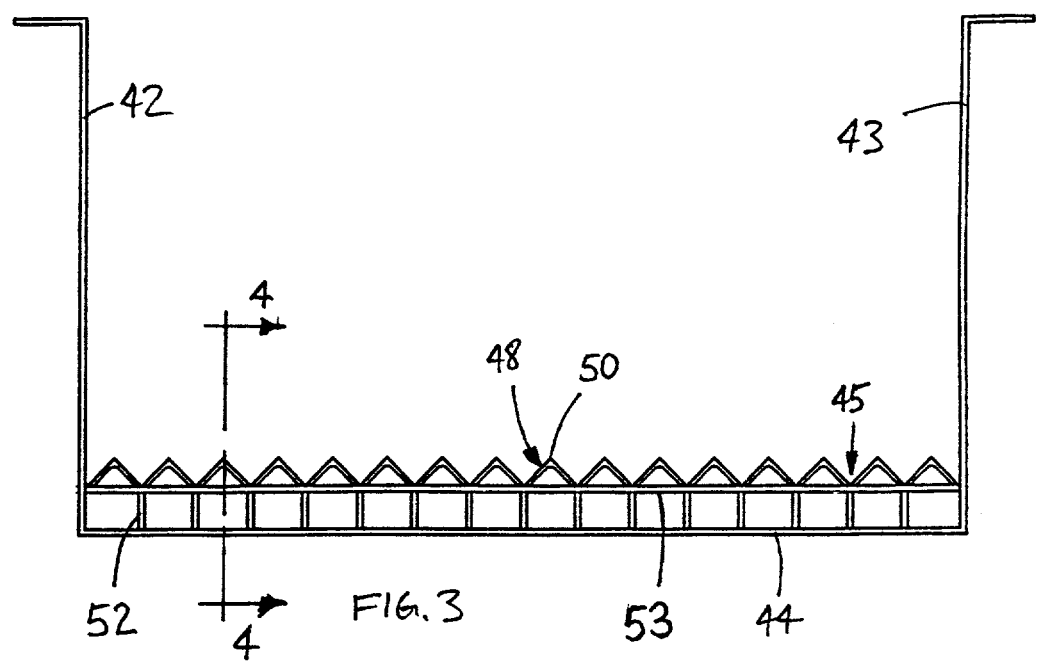
FIG. 3 is an end view of an alternative trough having an elevated support bed.

Referring to FIG. 1, vibratory apparatus for separating liquid from a liquid-laden solid material is indicated generally by reference numeral 10. The vibratory separating apparatus 10 is described herein for use in a petroleum coke dewatering process. It will be understood, however, that this is but a single application, and that the vibratory separating apparatus 10 may be used in any process that would benefit from the efficient separation of liquid from a liquid-laden solid material.

Figure 11:
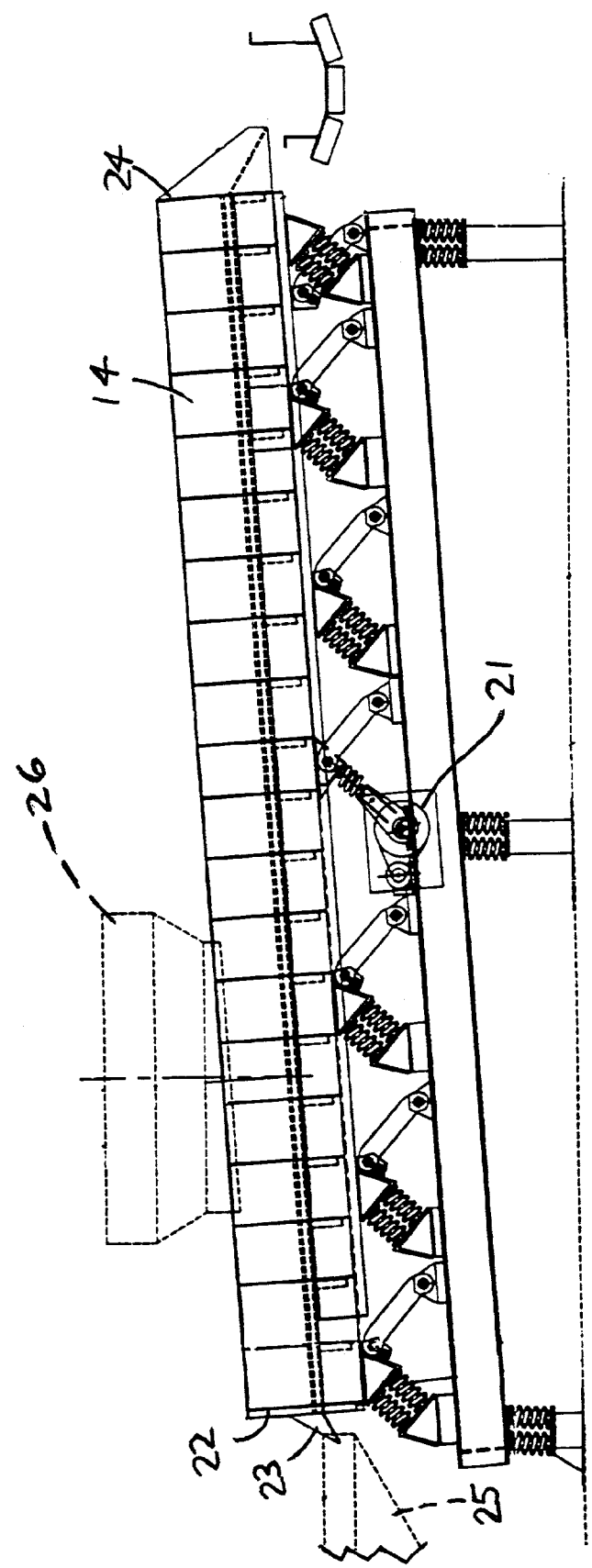
FIG. 11 is a side elevation view of a vibratory separating apparatus having an alternative drive.

As shown in FIG. 1, the vibratory separating apparatus 10 includes a first separating unit 12 having a trough 14 supported by a frame 16. An exciter 18 is attached to the trough 14 and includes a rotating unbalance drive 20 for generating a vibratory motion, as is generally known in the art. Alternatively, the separating unit 12 may include a rotating eccentric drive 21, as illustrated in FIG. 11.

The trough 14 is oriented on an incline so that a first end 22 is positioned below a second end 24. The exciter 18 is oriented so that the vibratory motion created by the drive 20 imparts a conveying motion toward the elevated second end 24. A hopper 26 may be positioned above a central portion of the trough 14 for directing liquid-laden material into the trough. For example, a coking drum having petroleum coke lodged therein may be positioned over the hopper 26, so that the pieces of petroleum coke removed from the drum fall into the central portion of the trough 14. The first end 22 of the trough 14 further includes a chute 23 for directing liquid into a drainage receptacle 25.

In the illustrated embodiment, the vibratory separating apparatus 10 also includes a second separating unit 28 that is substantially identical to the first separating unit 12. Accordingly, the second separating unit 28 includes a trough 30 supported by a frame 32. An exciter 34 is operably connected to the trough 30 and includes a drive 36 for generating a vibratory motion. The trough 30 is also oriented on an incline so that a first end 38 is lower than a second end 40 of the trough. The exciter 34 is oriented to impart a conveying motion which advances material in the trough 30 from the first end 38 to the elevated second end 40. Apparatus for generating such a vibratory conveying motion are generally known in the art, and therefore are not described in detail herein. The first end 38 of the trough 30 also includes a chute 39 for directing liquid into a drainage receptacle 41.

The first end 38 of the trough 30 may be positioned below the second end 24 of the trough 14, so that material advancing over the second end 24 of the trough 14 will drop into the trough 30 of the second separating unit 28. In the illustrated embodiment, the second end 24 of trough 14 is positioned somewhat upstream of the first end 38 of trough 30. The second end 40 of the trough 30 may be positioned over a receptacle, conveyor, or other transport apparatus for further processing of the solid material. It will be appreciated that the second unit 28 further separates liquid from the liquid-laden solid material, but is not required in all applications, since a single separating unit 12 may provide sufficient separation.

While both exciters 18, 34 are shown position below the troughs 14, 30, it will be appreciated that the exciters may be positioned above the troughs or in any other location currently known in the art.

Figure 2:
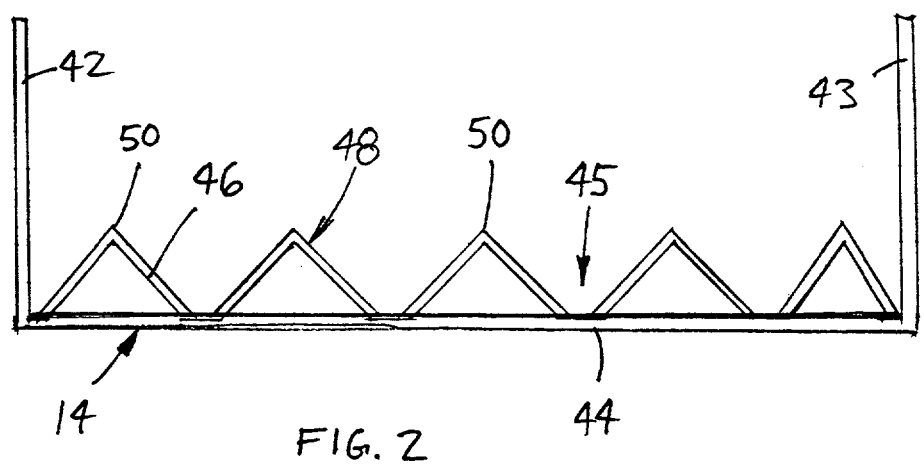
FIG. 2 is a schematic end view of a trough used in the apparatus shown in FIG.1.

FIG. 2 illustrates an end view of the trough 14. The trough 14 includes opposing sidewalls 42, 43 connected by a base 44. A plurality of V-shaped angles 46 are attached to the base 44 and extend longitudinally along the length of the trough 14. Each V-shaped angle 46 has an apex 48 and defines one or more support points 50. In the current embodiment in which the V-shaped angles 46 extend continuously along the length of the trough 14, the support points 50 create a pattern of support lines. The support points 50 are positioned above the base 44 and are spaced at a distance sufficient to engage and support substantially all of the solid material above the base 44. Edges of adjacent V-shaped angles define passages 45, which allow the fluid contained by the material to pass through to the base 44. Accordingly, the V-shaped angles 46 suspend the solid material above the base 44 to allow liquid to drain from the solid material under the force of gravity.

Because the trough 14 is on an incline, the liquid will flow toward the first end 22 and through the chute 23 for discharge into the drainage receptacle 25. In contrast, the solid material supported by the V-shaped angles 46 is advanced toward the second end 24 of the trough 14 as a result of the vibratory conveying motion generated by the exciter 18. In the illustrated embodiment the solid material is ultimately discharged into the trough 30 of the second separating unit 28 having a substantially identical base construction. Accordingly, additional liquid is removed from the solid material and flows to the first end 38 and through the chute 39 for discharge into the drainage receptacle 41, while the solid material is advanced toward the second end 40 of the trough 30.

While FIG. 2 illustrates apparatus in which the solid and liquid materials flow in opposite directions (i.e., a reverse flow arrangement), the separating units 12, 28 may be configured for other material flow patterns. For example, the solid material may be conveyed down the inclined trough and a liquid drainage point may be located upstream of the solids discharge point, to produce a concurrent flow of solid and liquid materials. The liquid drainage point may be an outlet formed in the base, while the solids discharge point may be the trough first end.

Figure 4:
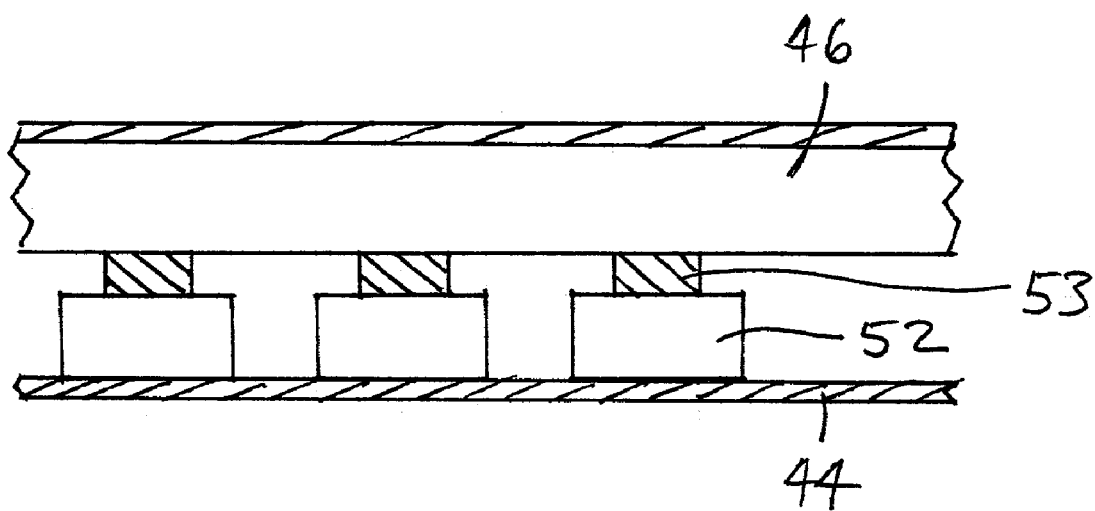
FIG. 4 is a side elevation view, in cross-section, taken along line 4—4 of FIG. 3.

In an alternative trough embodiment illustrated at FIGS. 3 and 4, the support points 50 are further elevated with respect to the trough base 44. In this embodiment, spacer bars 52 are intermittently positioned along the length of the trough base 44. Cross bars 53 are attached to the tops of the spacer bars 52 and extend transversely across the trough 14. The V-shaped angles 46 are then attached to the cross bars 53. Liquid may flow through the passages 45 between adjacent angles 46 and the gaps between the spacer and cross bars 52, 53 to drain from the solid material. The spacer and cross bars 52, 53 increase the height of the support points 50 with respect to the trough base 44, thereby increasing the liquid volume capacity of the separating unit.

Figure 5:
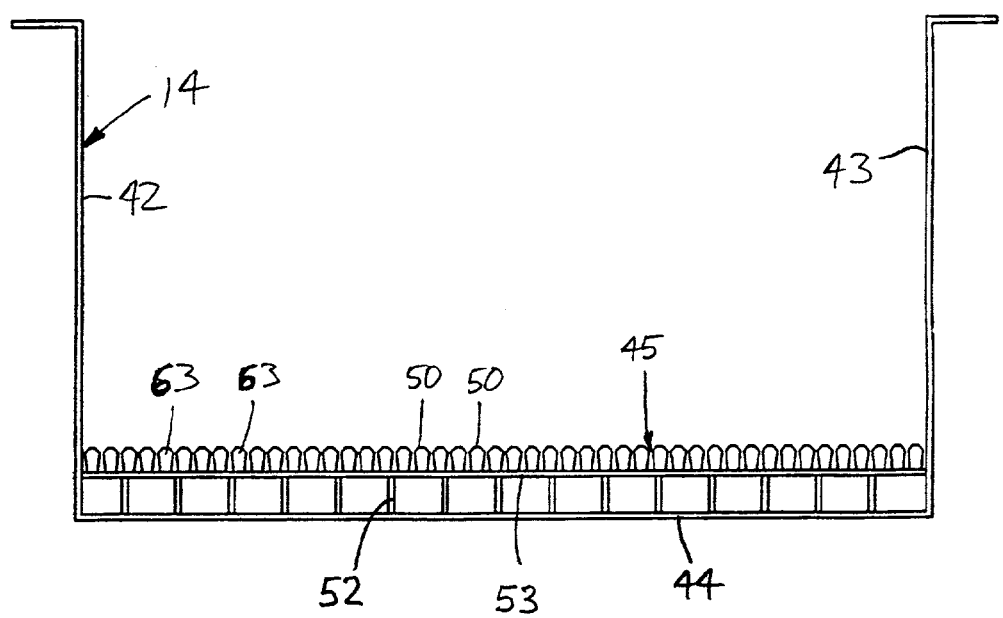
FIG. 5 is an end view of an alternative tough having a deck formed of grouser bars.
Figure 6:
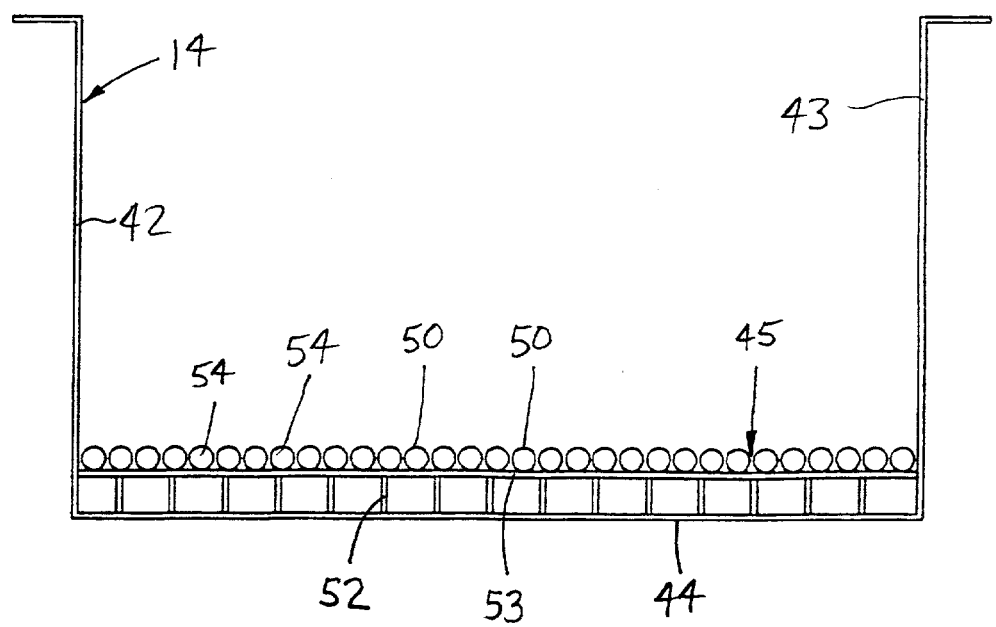
FIG. 6 is an end view of an alternative tough having a deck formed of round rods.
Figure 7:
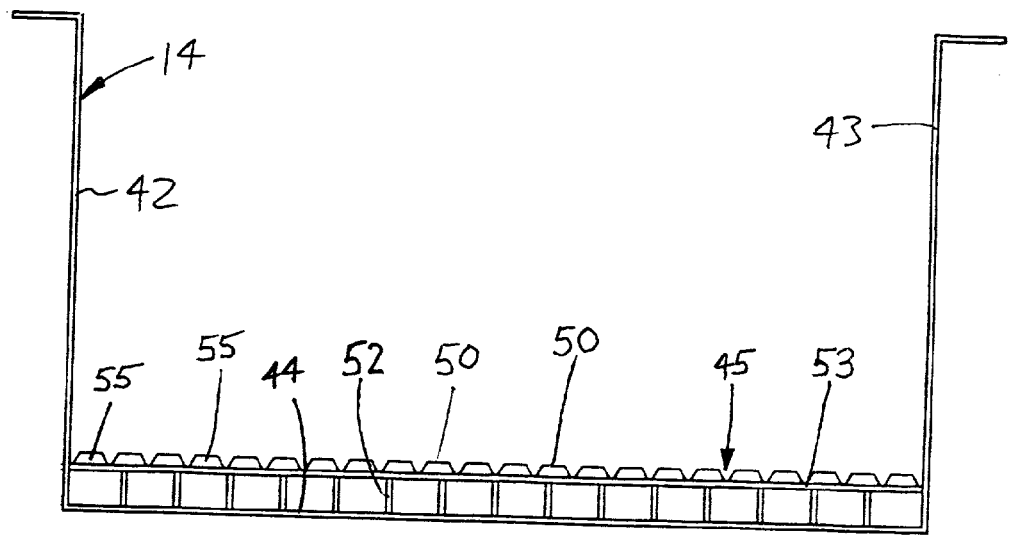
FIG. 7 is an end view of an alternative tough having a deck formed of tapered bars.
Figure 8:
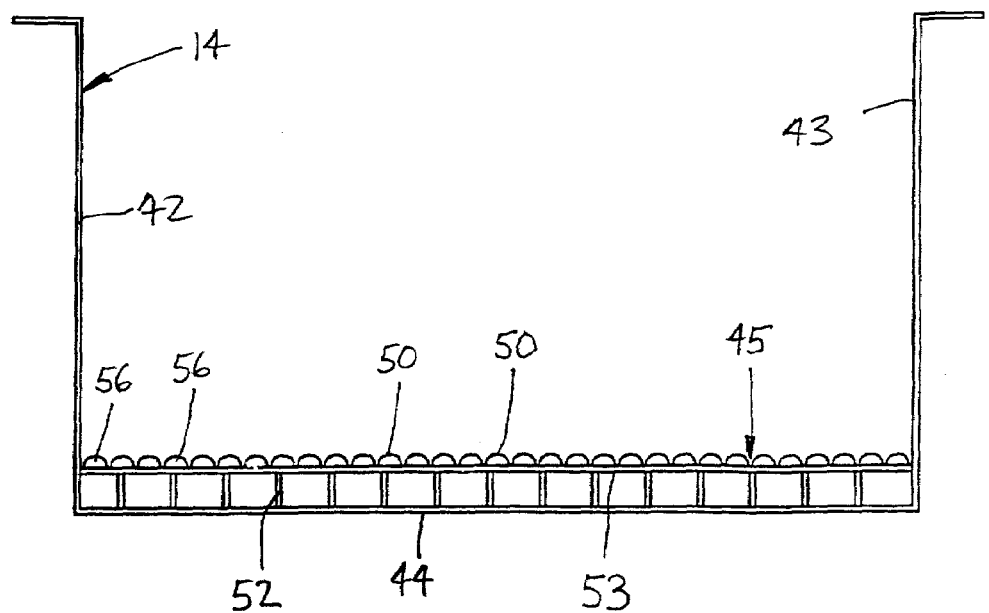
FIG. 8 is an end view of an alternative tough having a deck formed of half rounds.
Figure 9:
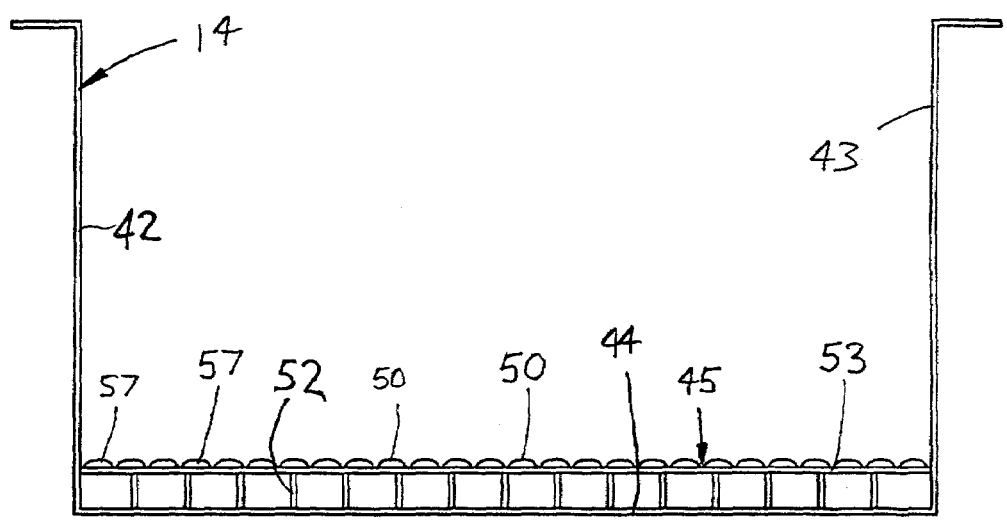
FIG. 9 is an end view of an alternative tough having a deck formed of half ovals.

While the above embodiments describe the use of V-shaped angles, it will be appreciated that any type of deck that creates support points positioned above the base 44 and spaced a distance sufficient to support the solid material may be used. Accordingly, the deck may comprise a plurality of grouser bars 63 (FIG. 5), round rods 54 (FIG. 6), tapered bars 55 (FIG. 7), half rounds 56 (FIG. 8), half ovals 57 (FIG. 9), or any other structure that defines the support points 50. The spacer and cross bars 52, 53 shown in the embodiments of FIGS. 5–9 may be omitted without departing from the teachings of the present invention.

Figure 10:
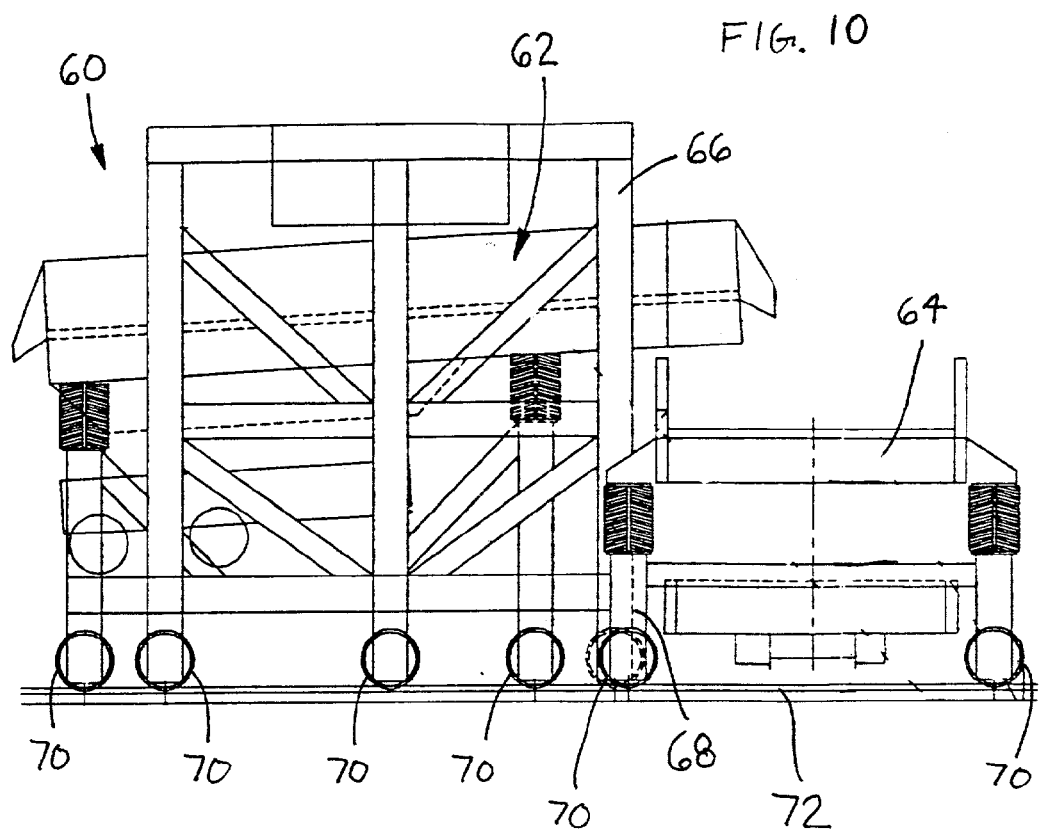
FIG. 10 is a side elevation view of an alternative vibratory separating apparatus adapted for mobile transportation.

In an alternative embodiment illustrated at FIG. 10, a vibratory separating apparatus 60 is shown that is adapted for mobile transportation. Similar to the embodiment of FIG. 1, the vibratory separating apparatus 60 includes first and second separating units 62, 64. Other than the second separating unit 64 being positioned transversely with respect to the first separating unit 62, the units 62, 64 are constructed substantially identical to the first and second separating units 12, 28 of the above embodiment. In addition, the first and second separating units 62, 64 are mounted on frames 66, 68 having wheels 70. As shown in FIG. 10, the wheels 70 are adapted for use with rails 72 to allow the vibratory separating apparatus 60 to be transported to different locations. This is particularly advantageous, for example, where multiple coking drums are located at a single site. As a result, a single vibratory separating apparatus 60 may be used to dewater petroleum coke from the various coking drums.

In operation, a petroleum coking drum may be positioned over the hopper 26 of the vibratory separating apparatus 10. The hopper 26 assists in directing the water-laden petroleum coke toward a central portion of the trough 14 of the first separating unit 12. The V-shaped angles 46 engage and support the petroleum coke above the base 44 of the trough 14, thereby allowing the water to drain from the coke to the trough base 44 via the passages 45. The inclined trough 14 causes the water to flow toward the first trough end 22 under the force of gravity, so that the water is discharged by the chute 23 into the drainage receptacle 25. The petroleum coke supported on the V-shaped angles 46, however, is advanced toward the trough second end 24 as a result of the vibratory motion generated by the exciter 18. The petroleum coke is eventually discharged from the second end 24 of the trough 14 into the trough 30 of the second separating unit 28. A similar process continues in the second separating unit 28, wherein additional liquid flows toward the trough first end 38 and through the chute 39 to discharge in the drainage receptacle 41. Vibratory motion generated by the exciter 34 advances the petroleum coke toward the trough second end 40. The petroleum coke may be discharged from the trough second end 40 onto a vibratory conveyor, receptacle, or other transport for further processing.

While FIG. 10 illustrates frames 66, 68 having wheels 70, it will be appreciated that other types of mobile frames, such as rotating or translating frames, may be used without departing from the scope of the present invention.

Although certain apparatus constructed in accordance with teachings of the invention have been described herein, the scope of coverage of this patent is not limited thereto. On the contrary, this patent covers all embodiments of the teachings of the invention fairly falling within the scope of the appended claims either literally or under the doctrine equivalents.

The invention claimed is:

1. A vibratory apparatus for separating a liquid from a liquid laden solid material, the apparatus comprising:
    an inclined trough having a base, the trough defining a solids discharge point and a liquid drainage point;
    a deck attached to the trough base, the deck including a plurality of inverted V-shaped angles extending longitudinally along the trough base, each inverted V-shaped angle having a solid first wall surface and a solid second wall surface,
    the first and second wall surface of each angle meeting along a first edge at an upwardly oriented apex which defines a support point positioned above the base, the support points of the angles being spaced from one another by a distance sufficient to support the solid material above the base, and the first and second wall surface of each angle having a second edge, the second edges of adjacent angles being spaced to define a passage between adjacent support points, wherein the support points are located at an elevation sufficiently above the base to allow liquid to drain from the solid material and flow through the passage to the trough base; and a vibratory drive attached to the trough and oriented to impart a conveying motion toward the solids discharge point;

wherein the solid material deposited onto the deck is advanced toward the solids discharge point by the conveying motion while the liquid flows along the trough base toward the liquid drainage point under gravity.

2. The apparatus of claim 1, further comprising a hopper located above the trough for directing the liquid-laden solid material toward a central portion of the trough.

3. The apparatus of claim 1, further comprising spacers positioned between the deck and the trough base.

4. The apparatus of claim 1, in which the solid comprises petroleum coke.

5. The apparatus of claim 1, in which the trough is mounted on a mobile frame.

6. The apparatus of claim 5, in which the frame comprises wheels adapted to travel along tracks.

7. The apparatus of claim 1, in which the vibratory drive comprises a rotating eccentric drive.

8. The apparatus of claim 1, in which the vibratory drive comprises a rotating unbalance drive.

9. The apparatus of claim 1, in which the trough has a first end and a second end, wherein the trough second end is elevated with respect to the trough first end.

10. The apparatus of claim 9, in which the trough second end comprises the solids discharge point and the trough first end comprises the liquid drainage point.

11. A vibratory apparatus for separating a liquid from the liquid-laden solid material, the apparatus comprising:

a first separating unit having:
an inclined trough having a base, the trough defining a solids discharge point and a liquid drainage point;
a deck attached to the trough base, the deck including a plurality of inverted V-shaped angles extending longitudinally along the trough base, each inverted V-shaped angle having a solid first wall surface and a solid second wall surface,
the first and second wall surface of each angle meeting along a first edge at an upwardly oriented apex which defines a support point positioned above the base, the support points of the angles being spaced from one another by a distance sufficient to support the solid material above the base, and the first and second wall surface of each angle having a second edge, the second edges of adjacent angles being spaced to define a passage between adjacent support points, wherein the support points are located at an elevation sufficiently above the base to allow liquid to drain from the solid material and flow through the passage to the trough base; and a vibratory drive attached to the trough and oriented to impart a conveying motion toward the solids discharge point, wherein the solid material deposited onto the deck is advanced toward the solids discharge point by the conveying motion while the liquid flows along the trough base toward the liquid drainage point end under gravity; and a second separating unit having:
an inclined trough having a central portion positioned below the trough second end of the first separating unit, the trough having a base and defining a solids discharge point and a liquid drainage point;
a deck attached to the trough base, the deck including a plurality of inverted V-shaped angles extending longitudinally along the trough base, each inverted V-shaped angle having a solid first wall surface and a solid second wall surface,
the first and second wall surface of each angle meeting along a first edge at an upwardly oriented apex which defines a support point positioned above the base, the support points of the angles being spaced from one another by a distance sufficient to support the solid material above the base, and the first and second wall surface of each angle having a second edge, the second edges of adjacent angles being spaced to define a passage between adjacent support points, wherein the support points are located at an elevation sufficiently above the base to allow liquid to drain from the solid material and flow through the passage to the trough base; and
a vibratory drive attached to the trough and oriented to impart a conveying motion towards the solids discharge point, wherein solid material deposited onto the deck is advanced toward the solids discharge point by the conveying motion while the liquid flows along the trough base toward the liquid drainage point under gravity.

12. The apparatus of claim 11, further comprising a hopper located above a central portion of the trough of the first separating unit.

13. The apparatus of claim 11, in which each trough of the first and second separating units further comprises spacers positioned between the deck and the trough base.

14. The apparatus of claim 11, in which the troughs of the first and second separating units are mounted on a mobile frame.

15. The apparatus of claim 14, in which the frame comprises wheels adapted to travel along tracks.

16. The apparatus of claim 11, in which the vibratory drives of the first and second separating units comprise rotating eccentric drives.

17. The apparatus of claim 11, in which the vibratory drives of the first and second separating units comprise rotating unbalance drives.

* * * * *